United States Patent
Umezawa et al.

(10) Patent No.: US 10,814,837 B2
(45) Date of Patent: Oct. 27, 2020

(54) NOZZLE, MANUFACTURING METHOD OF THE SAME, AND WASHER NOZZLE

(71) Applicant: Mitsuba Corporation, Kiryu-shi, Gunma (JP)

(72) Inventors: Takao Umezawa, Kiryu (JP); Atsushi Otani, Kiryu (JP); Hiroshi Yokoyama, Kiryu (JP)

(73) Assignee: Mitsuba Corporation, Kiryu-shi, Gunma (JP)

( * ) Notice: Subject to any disclaimer, the term of this patent is extended or adjusted under 35 U.S.C. 154(b) by 268 days.

(21) Appl. No.: 14/333,613

(22) Filed: Jul. 17, 2014

(65) Prior Publication Data
US 2015/0197218 A1 Jul. 16, 2015

(30) Foreign Application Priority Data
Jan. 16, 2014 (JP) .................................... 2014-5918

(51) Int. Cl.
*B60S 1/52* (2006.01)
*B29C 45/00* (2006.01)
(Continued)

(52) U.S. Cl.
CPC ................ *B60S 1/52* (2013.01); *B05B 1/044* (2013.01); *B05B 15/652* (2018.02);
(Continued)

(58) Field of Classification Search
CPC ... B60S 1/52; B29C 45/1635; B29C 45/0062; B29C 2045/0063; B05B 15/652;
(Continued)

(56) References Cited

U.S. PATENT DOCUMENTS 476,966 A * 6/1892 Spencer ................ B05B 1/1636
239/444
3,192,090 A * 6/1965 Sarafinas .................. B60S 1/52
156/217
(Continued)

FOREIGN PATENT DOCUMENTS

JP 2002067887 A * 3/2002 ............... B05B 1/08
JP 2005199193 A * 7/2005 ............... B05B 1/08
(Continued)

OTHER PUBLICATIONS

WO2012172943 Machine Translation (Year: 2012).*

*Primary Examiner* — Arthur O. Hall
*Assistant Examiner* — Steven M Cernoch
(74) *Attorney, Agent, or Firm* — McCormick, Paulding & Huber PLLC

(57) ABSTRACT

An object of the present invention is to suppress variations in shape of flow channels to have an enlarged flow channel. When an attachment main body 51 of a lid member 50 is attached to a recessed attachment part 46 of a main body member 40, a pair of flange parts 52 provided to the lid member 50 abuts on the main body member 40. Therefore, the insertion amount of the attachment main body 51 into the recessed attachment part 46 in each product can be maintained approximately constant while enlarging a main channel MC and a pair of sub channels SS1 and SS2, which are formed by the main body member 40 and the lid member 50, and variations in shape of these flow channels can be reliably suppress. The contact surfaces between the lid member 50 and the main body member 40 can be bent by providing the flange parts 52, and when forming a covering member 60, the molten resin can be prevented from leaking from the outside of the lid member 50 toward the main flow channel MS and the pair of sub flow channels SS1 and SS2, and as (Continued)

a result, variations in shape of the flow channels can be reliably suppressed.

5 Claims, 12 Drawing Sheets

(51) Int. Cl.
    *B05B 1/04*     (2006.01)
    *B05B 15/652*     (2018.01)
    *B05B 1/08*     (2006.01)

(52) U.S. Cl.
    CPC ............ *B29C 45/0062* (2013.01); *B05B 1/08* (2013.01); *B29C 2045/0063* (2013.01)

(58) Field of Classification Search
    CPC ......... B05B 1/044; B05B 1/08; B05B 1/1636; B05B 1/18
    USPC ............................................ 239/284.1, 589.1
    See application file for complete search history.

(56) References Cited

U.S. PATENT DOCUMENTS

| | | | | |
|---|---|---|---|---|
| 4,088,269 A * | 5/1978 | Schlick | ............... | B05B 1/24 137/341 |
| 4,185,777 A * | 1/1980 | Bauer | ............... | B05B 1/08 239/394 |
| 4,394,965 A * | 7/1983 | Backe | ............... | B05B 1/08 239/589.1 |
| 5,195,206 A * | 3/1993 | Bauer et al. | ............... | 15/250.1 |
| 5,205,490 A * | 4/1993 | Steinhardt | ............ | B05B 1/1636 239/449 |
| 5,433,382 A * | 7/1995 | Baumgarten | .......... | B60S 1/522 239/284.1 |
| 5,657,929 A * | 8/1997 | DeWitt et al. | ............ | 239/284.2 |
| 5,762,271 A * | 6/1998 | Lind et al. | ............... | 239/284.2 |
| 5,975,431 A * | 11/1999 | Harita | ............... | B60S 1/52 15/322 |
| 6,113,006 A * | 9/2000 | Walker | ............... | B60S 1/52 239/284.1 |
| 6,296,198 B1 * | 10/2001 | Tores | ............... | B60S 1/481 239/284.1 |
| 6,463,621 B1 * | 10/2002 | Zimmer | ............... | B60S 1/522 15/250.04 |
| 6,464,150 B1 * | 10/2002 | Zimmer | ............... | B05B 1/323 239/115 |
| 7,316,362 B2 * | 1/2008 | Miyauchi | ............... | B05B 1/08 239/102.1 |
| 7,429,004 B2 * | 9/2008 | Kondou | ............... | B05B 1/04 239/284.1 |
| 7,461,796 B2 * | 12/2008 | Yamaguchi | ............... | B05B 1/04 239/131 |
| 7,775,456 B2 * | 8/2010 | Gopalan | ............... | B05B 1/08 137/809 |
| 8,662,421 B2 * | 3/2014 | Russell | ............... | B05B 1/08 239/284.1 |
| 9,199,254 B2 * | 12/2015 | Zhou | ............... | B05B 1/1636 |
| 9,205,811 B2 * | 12/2015 | Miyauchi | ............... | B60S 1/52 |
| 9,556,969 B2 * | 1/2017 | Sato | ............... | B05B 1/12 |
| 2005/0116063 A1 * | 6/2005 | Wang | ............... | B05B 1/1636 239/380 |
| 2006/0043110 A1 * | 3/2006 | Miyauchi | ............... | B05B 1/08 222/129.1 |
| 2006/0226266 A1 * | 10/2006 | Russell | ............... | B05B 1/08 239/589.1 |
| 2009/0188991 A1 * | 7/2009 | Russell et al. | ............... | 239/203 |
| 2011/0215173 A1 * | 9/2011 | Hartnell | ............... | 239/284.2 |
| 2013/0126645 A1 * | 5/2013 | Zhou | ............... | B05B 1/18 239/581.1 |
| 2015/0183404 A1 * | 7/2015 | Romack et al. | ............ | 239/284.1 |

FOREIGN PATENT DOCUMENTS

| | | | | |
|---|---|---|---|---|
| JP | 2006-89025 A | | 4/2006 | |
| JP | 2009227209 A | * | 10/2009 | ............... B05B 1/08 |
| JP | 2013001265 A | * | 1/2013 | ............... B05B 1/042 |
| WO | WO-2012172943 A1 | * | 12/2012 | ............... B05B 1/042 |

* cited by examiner

NOZZLE, MANUFACTURING METHOD OF THE SAME, AND WASHER NOZZLE

CROSS-REFERENCE TO RELATED APPLICATION

The present application claims priority from Japanese Patent Application No. 2014-5918 filed on Jan. 16, 2014, the content of which is hereby incorporated by reference into this application.

TECHNICAL FIELD OF THE INVENTION

The present invention relates to a nozzle which jets washer fluid toward a surface to be washed, a manufacturing method of the nozzle, and a washer nozzle.

BACKGROUND OF THE INVENTION

Conventionally, a vehicle, such as automobile, is equipped with a washer device for removing dirt, such as dust, from a surface to be washed, for example, a surface of a windshield. The washer device has a pump which is actuated by operating a wiper switch disposed in a vehicle compartment, etc. The pump operates to jet washer solution (washer fluid) out of a washer tank toward the surface to be washed through a hose and a washer nozzle. Since the washer fluid is jetted, and a wiper blade is reciprocated to make a wiping action, it is possible to remove the adhered dirt from the surface to be washed.

The washer nozzle has a nozzle which jets the washer fluid, and a so-called spread-type nozzle capable of spreading the washer fluid across a wide area of the surface to be washed is known as such a nozzle. This spread-type nozzle makes it possible to efficiently wash the surface to be washed using a small amount of the washer fluid. For example, techniques described in Patent Documents 1 and 2 are known as techniques related to such a spread-type nozzle.

A nozzle described in Japanese Patent Application Laid-Open Publication No. 2006-089025 is provided with: a spherical nozzle supporter, which is swingably supported by a nozzle body; and a nozzle main body, which is inserted in a recessed housing part formed on the inside of the nozzle supporter. A self-exciting oscillating flow channel is provided on the inside of the nozzle main body, and as a result, it applies oscillations to the cleaning solution, which passes through the oscillating flow channel, so that the cleaning solution is jetted to a wide range of the surface to be cleaned as a result.

Incidentally, the nozzle, which forms the washer nozzle, is a small part having a diameter less than 10 mm, and in order to support the recent increase in size of a front windshield under this restriction, it is necessary to develop a nozzle which can jet cleaning solution to a larger range. However, the nozzle described in above described Japanese Patent Application Laid-Open Publication No. 2006-089025 employs the structure in which the nozzle main body provided with the oscillating flow channel (flow channel) on the inside thereof is inserted in the recessed housing part on the inside of the nozzle supporter. Therefore, because of this structure, the flow channel through which the cleaning solution flows cannot be increased, and it has been difficult to spray the cleaning solution to a larger range.

Therefore, in order to increase the flow channel, it is conceivable to cause the nozzle supporter to have a divided structure; for example, a recessed groove to serve as a flow channel is integrally provided on a first one of divided bodies, and the other divided body is assembled with the first divided body so as to cover the recessed groove, thereby forming the flow channel. However, in this case, when the first divided body and the other divided body are to be connected, there has to be an arrangement so as not to leak a molten resin or the like for the connection from the outside of the divided bodies to the flow channel inside. If the molten resin or the like leaks to the flow channel, variations are generated in shape of the flow channel, and the spray range of the cleaning solution is also varied as a result.

An object of the present invention is to provide a nozzle capable of suppressing variations in shape of flow channels while enlarging the flow channel, a manufacturing method of the same, and a washer nozzle.

SUMMARY OF THE INVENTION

In accordance with one embodiment of the present invention, a nozzle for jetting cleaning solution to a surface to be cleaned, the nozzle comprising: a main body member having a recessed part; a lid member attached to the recessed part and forming a flow channel of the cleaning solution together with the main body member; a flange part provided to the lid member, extending in a direction intersecting with an attachment direction of the lid member to the recessed part, and abutting on the main body member with the lid member being attached to the recessed part; and a covering member covering part of the lid member exposed from the recessed part.

In accordance with another embodiment of the present invention, the main body member and the lid member have a first abutting surface and a second abutting surface which abut on each other, and form the flow channel, and when the flange part abuts on the main body member, the first abutting surface and the second abutting surface adhere to each other.

In accordance with still another embodiment of the present invention, the nozzle is formed into a spherical shape pivotably supported by a nozzle holding member; and an outer surface of the covering member is provided with a dent part at which a gate generated in injection molding of the covering member is disposed.

In accordance with yet another embodiment of the present invention, a manufacturing method of a nozzle for jetting cleaning solution to a surface to be cleaned, the method including: a mold preparing step of butting a first mold provided with a first cavity and a second core against a second mold provided with a first core and a second cavity; a main body-member molding step of injecting molten resin into a first gap formed by the first cavity and the first core, and molding a main body member provided with a recessed part; a lid-member molding step of injecting molten resin into a second gap formed by the second cavity and the second core, and molding a lid member which is attached to the recessed part to form a flow channel of the cleaning solution together with the main body member, and provided with a flange part extending in a direction intersecting with a direction of the attachment to the recessed part, and abutting on the main body member with the lid member being attached to the recessed part; a mold moving step of relatively moving the first and second molds to butt the first cavity against the second cavity, and cause the main body member and the lid member to abut on each other; and a covering-member molding step of injecting molten resin into the second cavity, causing the flange part to abut on the main body member while attaching the lid member to the recessed part by the molten resin, and molding a covering member which covers part of the lid member exposed from the recessed part.

In accordance with further embodiment of the present invention, the main body-member molding step and the lid-member molding step are carried out at the same time.

In accordance with still further embodiment of the present invention, a washer nozzle provided with a nozzle for jetting cleaning solution to a surface to be cleaned, and a nozzle holding member for retaining the nozzle, wherein the nozzle is provided with: a main body member having a recessed part; a lid member attached to the recessed part and forming a flow channel of the cleaning solution together with the main body member; a flange part provided to the lid member, extending in a direction intersecting with an attachment direction of the lid member to the recessed part, and abutting on the main body member with the lid member being attached to the recessed part; and a covering member covering part of the lid member exposed from the recessed part.

In accordance with yet further embodiment of the present invention, the nozzle is formed into a spherical shape and pivotably retained by a spherical recess of the nozzle holding member.

According to the present invention, when the lid member is attached to the recessed part of the main body member, the flange part provided to the lid member abuts on the main body member. As a result, the insertion amount of the lid member into the recessed part in each product can be maintained approximately constant. Therefore, while enlarging the flow channel which is formed by the main body member and the lid member, variations in shape of the flow channel can be suppressed reliably.

Furthermore, the contact surfaces between the lid member and the main body member can be bent by providing the flange part. Therefore, when the covering member is molded by the molten resin or the like, since the molten resin or the like can be prevented from leaking into the flow channel from the outside of the lid member, variations in shape of the flow channels can be suppressed reliably.

DETAILED DESCRIPTION

Hereinafter, one embodiment of the present invention will be described in detail with reference to the drawings.

Figure 1:
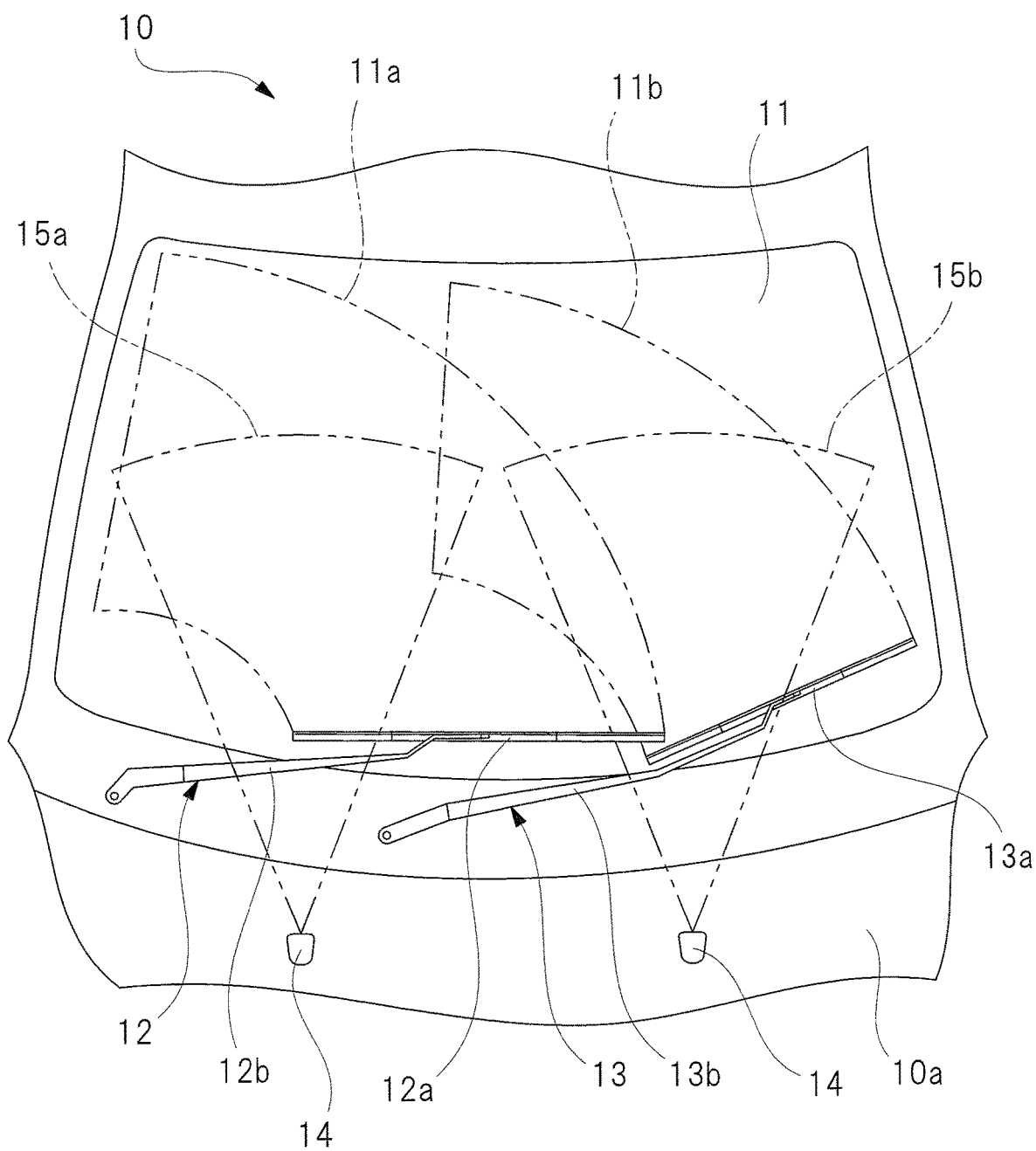
FIG. 1 is a diagram showing part of a vehicle mounted with a washer nozzle according to the present invention.
Figure 2:
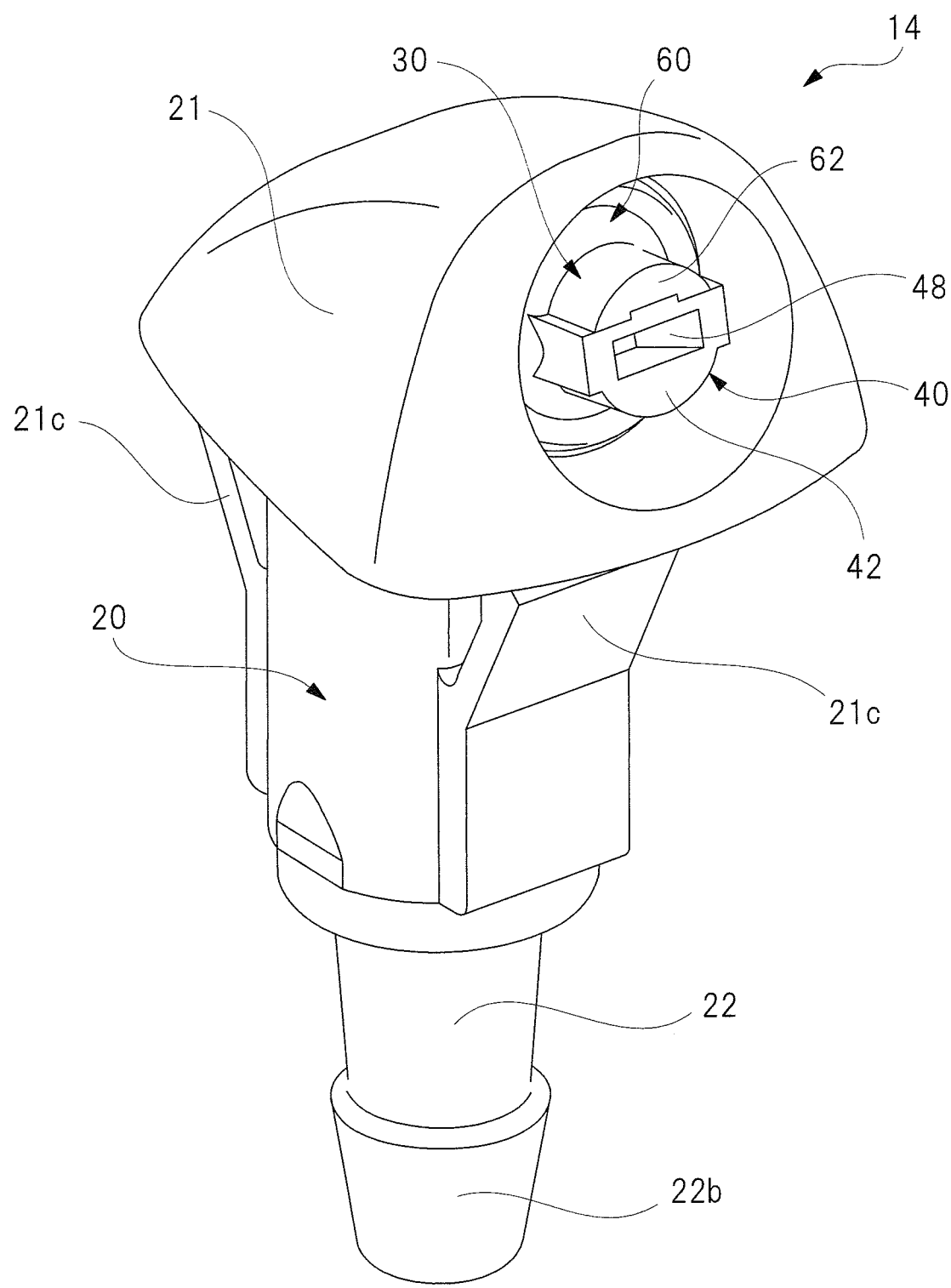
FIG. 2 is an enlarged perspective view showing the washer nozzle of FIG. 1.
Figure 3:
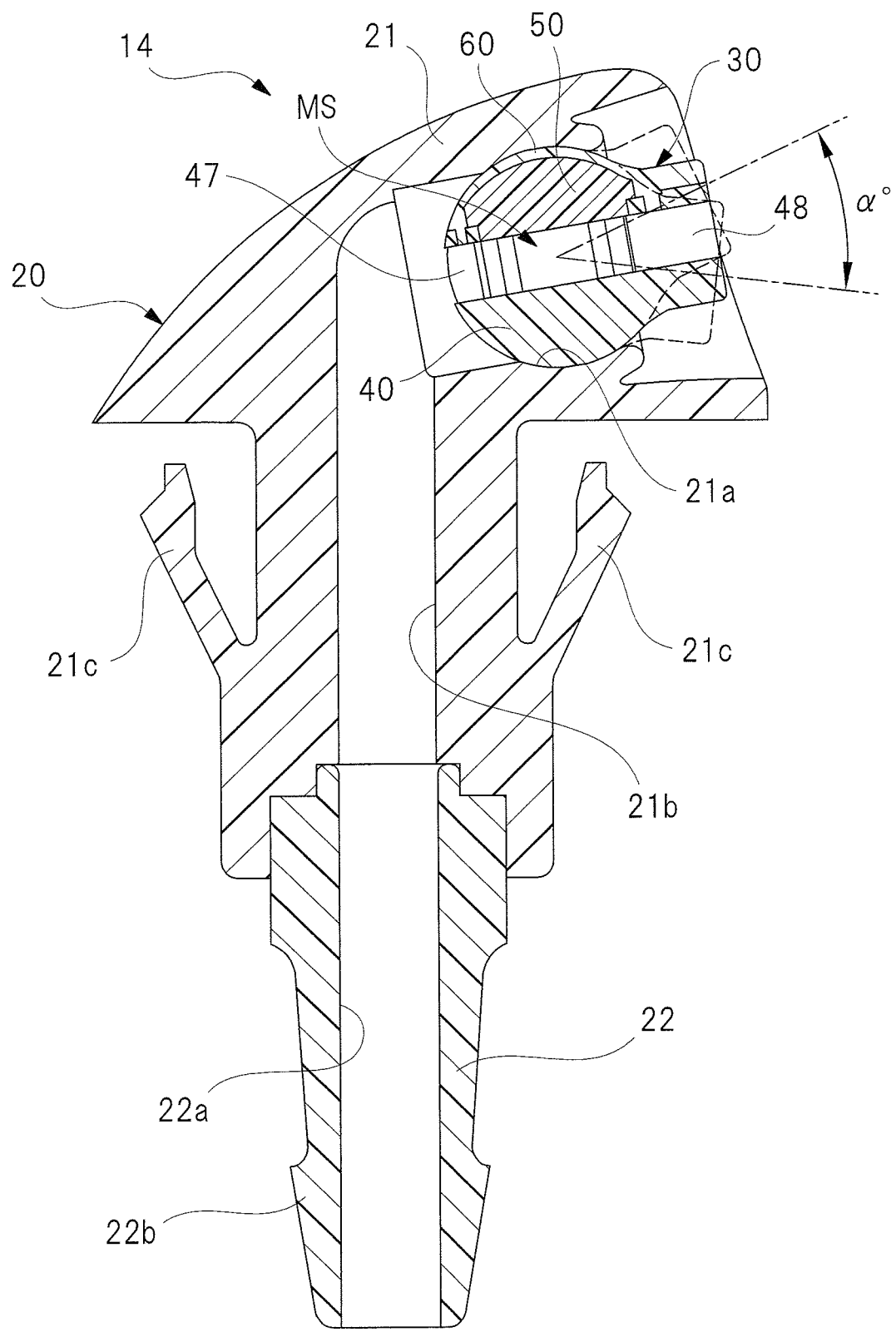
FIG. 3 is a cross sectional view of the washer nozzle of FIG. 2.
Figure 4:
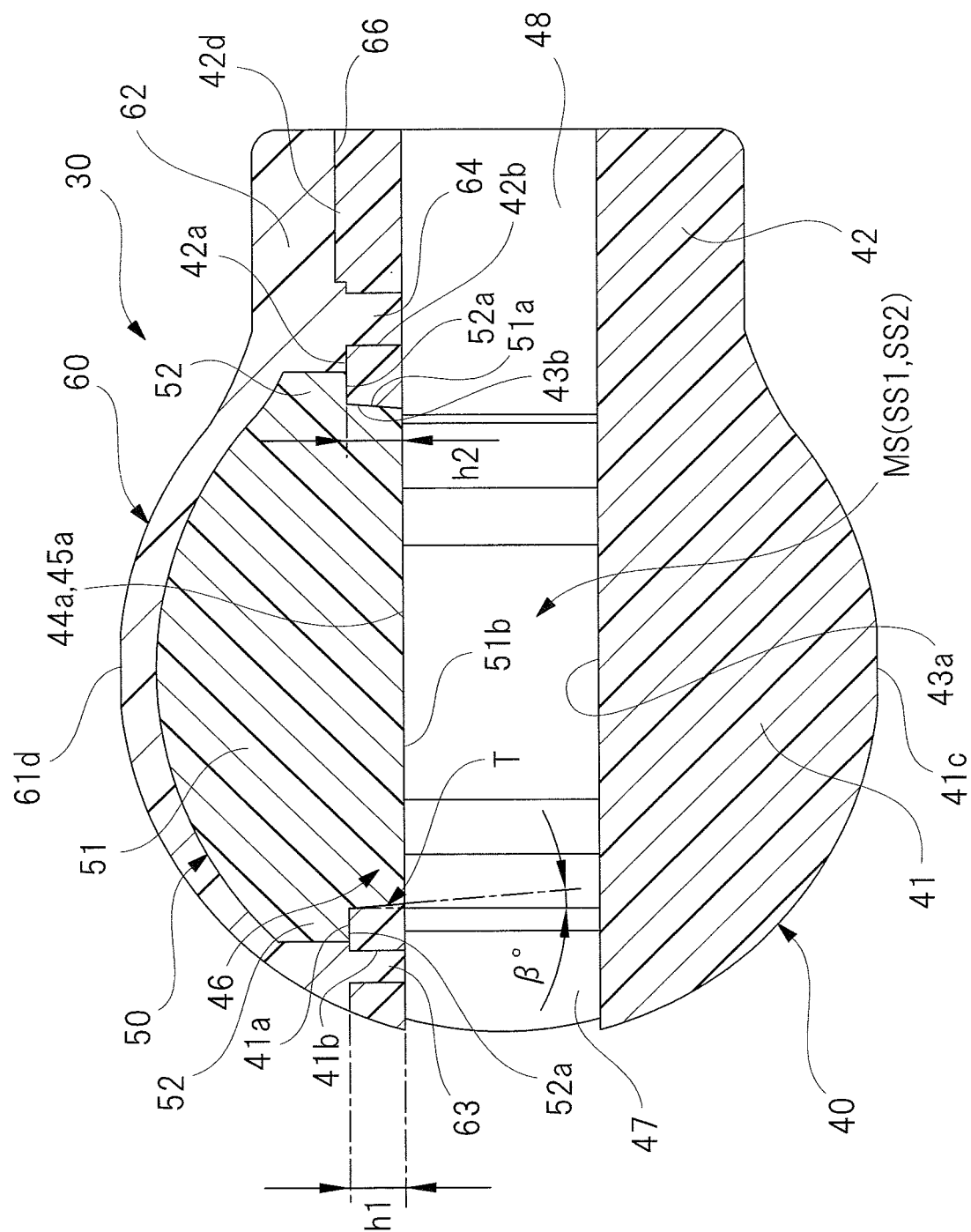
FIG. 4 is a cross sectional view showing the single nozzle of FIG. 2.
Figure 5:
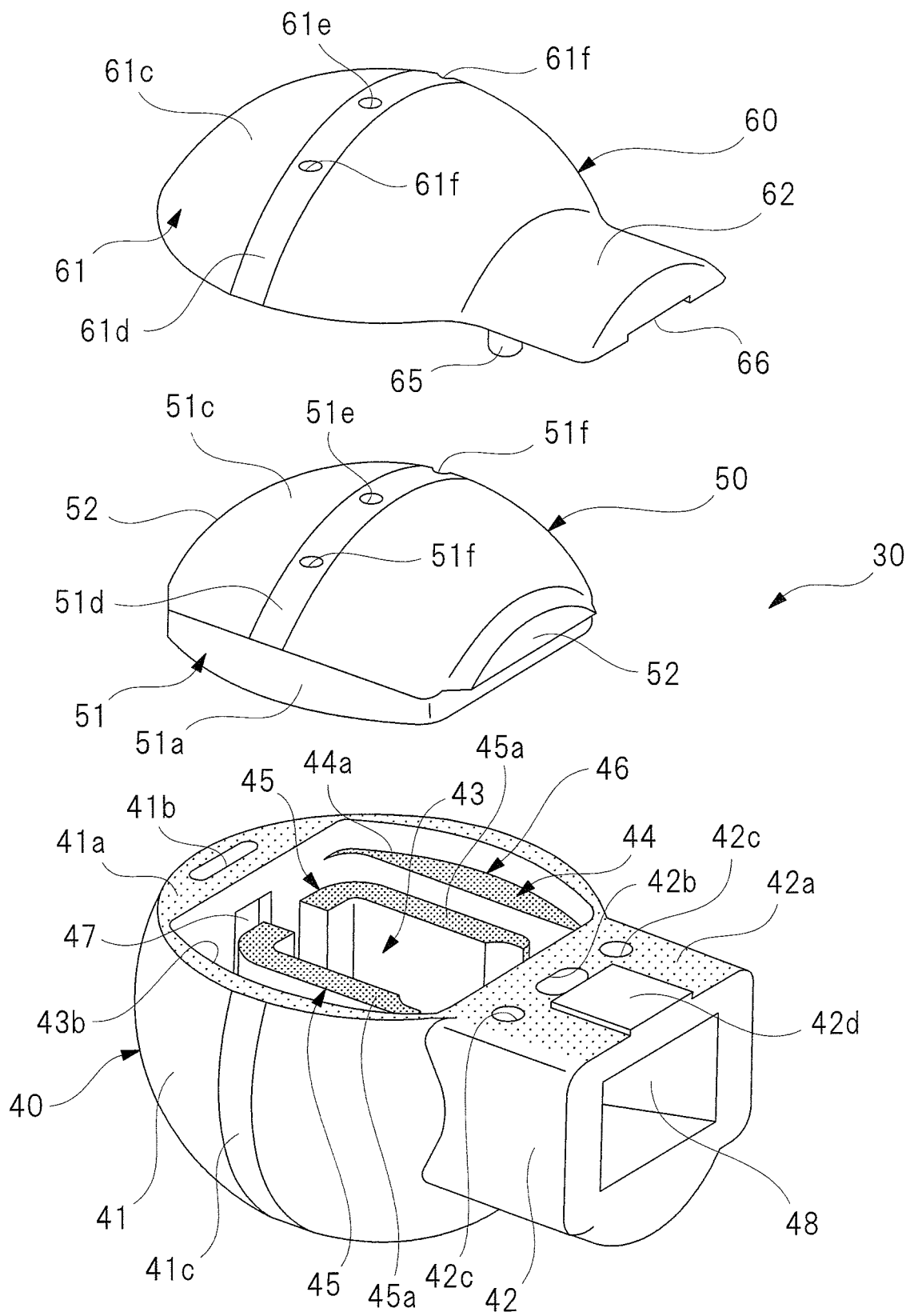
FIG. 5 is an exploded perspective view of the nozzle of FIG. 4.
Figure 6:
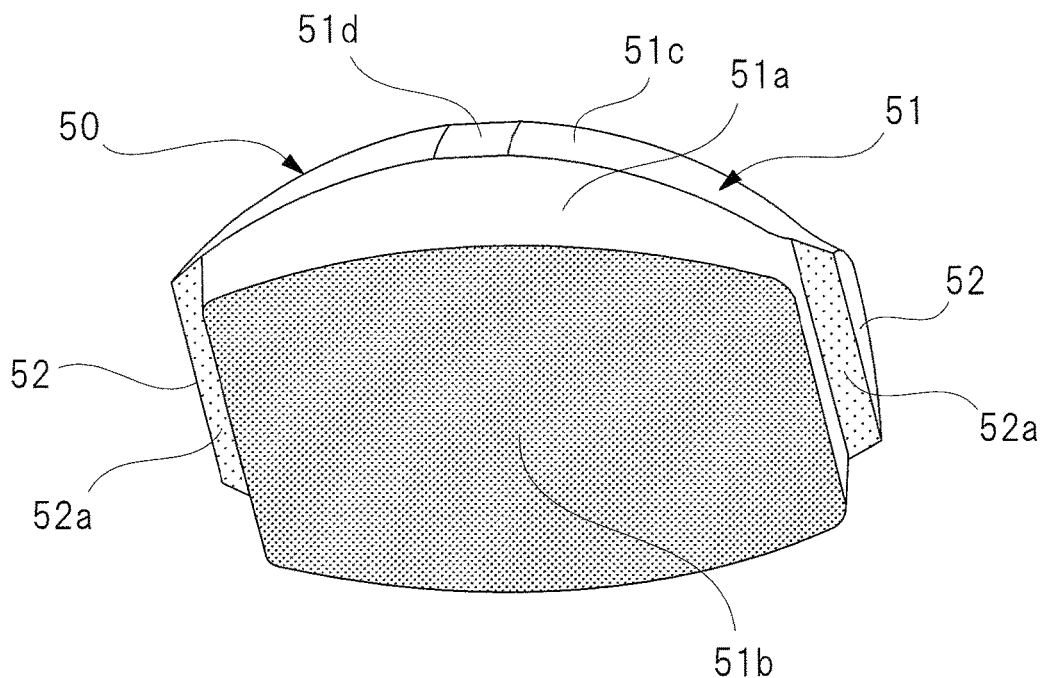
FIG. 6 is a perspective view showing the same side of a lid member as a main body member side of a lid member.
Figure 7:
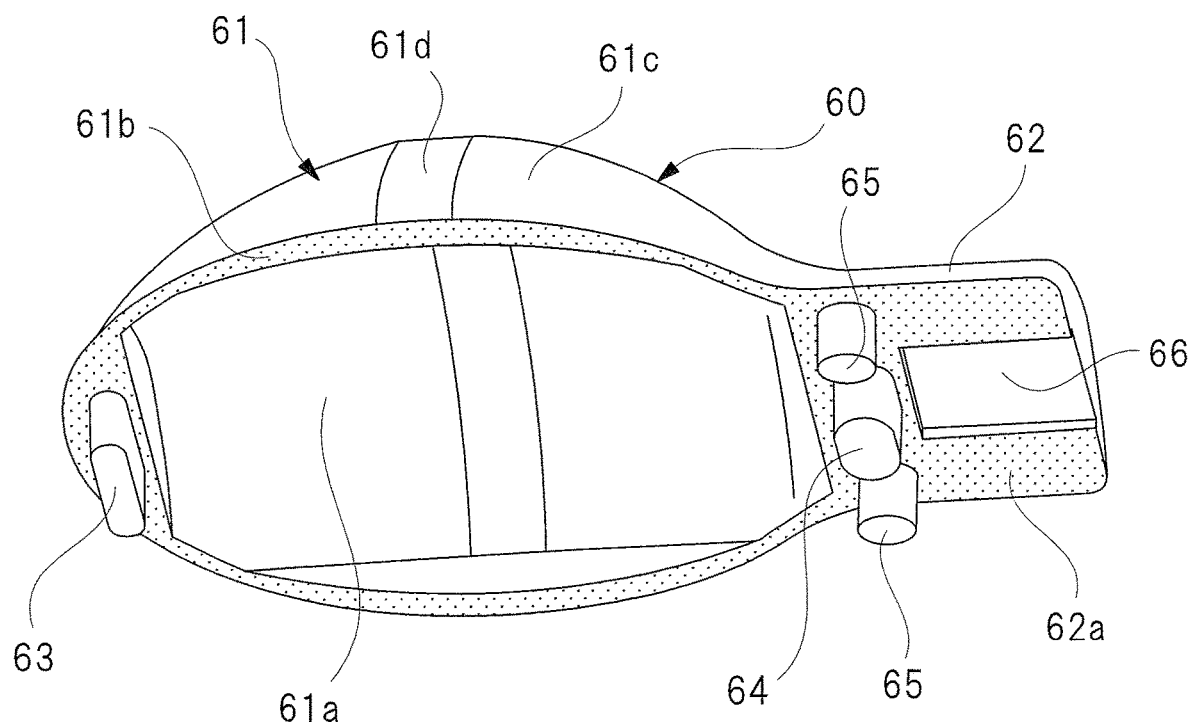
FIG. 7 is a perspective view showing the same side of a cover member as the main body member side of a covering member.
Figure 8:
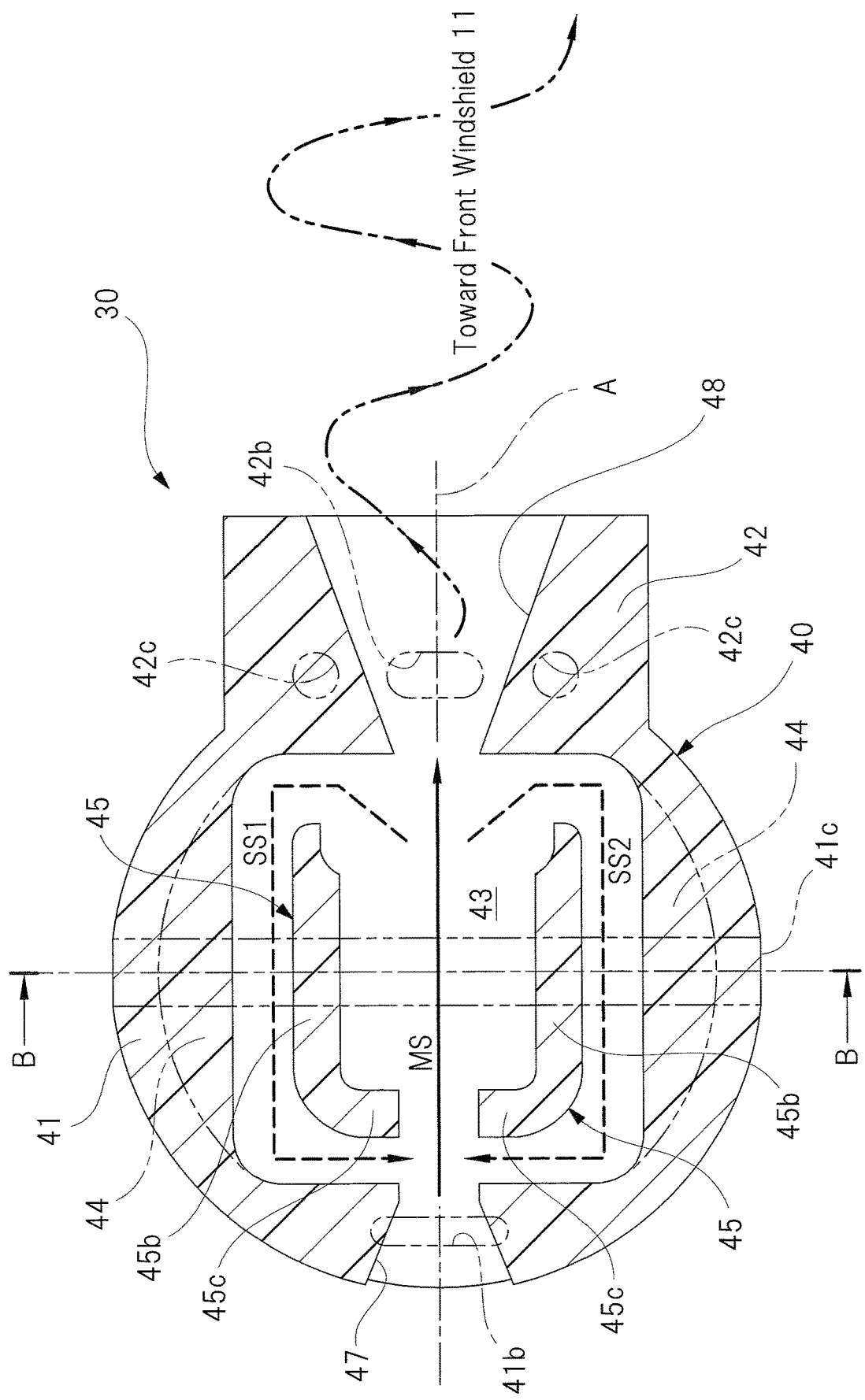
FIG. 8 is a cross sectional view of a main body member, explaining the shape of flow channels in the nozzle.

FIG. 1 is a diagram showing part of a vehicle mounted with a washer nozzle according to the present invention, FIG. 2 is an enlarged perspective view showing the washer nozzle of FIG. 1, FIG. 3 is a cross sectional view of the washer nozzle of FIG. 2, FIG. 4 is a cross sectional view showing the single nozzle of FIG. 2, FIG. 5 is an exploded perspective view of the nozzle of FIG. 4, FIG. 6 is a perspective view showing the same side of a lid member as a main body member, FIG. 7 is a perspective view showing the same side of a cover member as the main body member, and FIG. 8 is a cross sectional view of a main body member, explaining the shape of flow channels in the nozzle.

As shown in FIG. 1, a front windshield 11 is provided on the front side of a vehicle 10 such as automotive vehicle. A first wiper member 12 and a second wiper member 13 are swingably provided on the front windshield 11. The first wiper member 12 is arranged on the driver seat side of this vehicle, and the second wiper member 13 is arranged on the passenger seat side of this vehicle. Note that one surface of the front windshield 11, which is on the same side as the first and second wiper members 12 and 13, is defined as a surface to be washed in this invention.

The first wiper member 12 has a first wiper blade 12a and a first wiper arm 12b, and the first wiper blade 12a is pivotably attached to the front end of the first wiper arm 12b. The second wiper member 13 has a second wiper blade 13a and a second wiper arm 13b, and the second wiper blade 13a is pivotably attached to the front end of the second wiper arm 13b.

A link mechanism (not illustrated), which is configured to convert the rotary motion of a wiper motor (not illustrated) into a swinging motion of each of the first and second wiper arms 12b and 13b, is disposed on the base end side of the first and second wiper arms 12b and 13b. Therefore, each of the wiper first and second wiper blades 12a and 13a performs the swinging motion on the front windshield 11 within a range of a predetermined angle. Specifically, the first wiper blade 12a is reciprocated within a first wiping range 11a on the front windshield 11, and the second wiper blade 13a is reciprocated within a second wiping range 11b on the front windshield 11.

A hood 10a is provided on the front side of the vehicle 10. On the same side of the hood 10a as the front windshield 11, a pair of washer nozzles 14 is attached. Each of the washer nozzles 14 is connected to one end of a hose (not illustrated), while the other end of the hose is connected to a washer tank (not illustrated) via a pump (not illustrated). Each washer nozzle 14 is configured to diffuse and jet washer solution (washer fluid).

Furthermore, when a wiper switch (not illustrated) is operated by a driver or the like, the pump sucks and discharges the washer solution from the tank. The washer solution from the pump is jetted by each of the washer nozzles 14, and the washer solution from each of the washer nozzles 14 is spread to first and second jet areas 15a and 15b of the front windshield 11.

As shown in FIGS. 2 and 3, each washer nozzle 14 is provided with a nozzle holding member 20 and a nozzle 30. The nozzle holding members 20 and the nozzles 30 are molded out of resin material, such as plastic, into given shapes.

The nozzle holding member 20 has a head part 21 and a leg part 22, and these parts are separately produced and then connected to each other so as to form an integral structure. The head part 21 has a spherical recess 21a which is open toward the front windshield 11 with this washer nozzle 14 being fixed to the hood 10a (see FIG. 1). This spherical recess 21a is formed into a spherical shape, so that the spherical nozzle 30 is rotatably held in the spherical recess 21a.

The leg part 22 is formed into a cylindrical shape, and formed with a flow channel 22a through which the washer solution flows. One end of the flow channel 22a (upper side in FIG. 3) is connected to a flow channel 21b formed in the head part 21. The washer solution flowing through the flow channel 22a is led to the nozzle 30 via the flow channel 21b.

The other end of the leg part 22 is formed with a shoulder 22b which is connected to one end of a hose. The shoulder 22b is formed into a tapered shape toward the tip of the leg part 22, and this makes it easy to connect the hose to the washer nozzle, and prevents the hose from slipping off from the washer nozzle. On the same side of the head part 21 as the leg part 22, a pair of engaging claws 21c is provided. As a result of the fact that each washer nozzle 14 is inserted into a mounting hole (not illustrated) of the hood 10a with the engaging claws 21c being elastically deformed, the nozzle holding member 20, that is, each washer nozzle 14 is fixed to the hood 10a.

As shown in FIGS. 3 to 7, the nozzle 30 has a main body member 40, a lid member 50, and a covering member 60. Herein, the main body member 40, the lid member 50, and the covering member 60 are molded out of resin material, such as plastic, into given shapes.

The nozzle 30 is formed into a spherical shape by connecting the main body member 40, the lid member 50, and the covering member 60. By pushing, with a predetermined pressure toward the spherical recess 21a, the nozzle 30 formed into the spherical shape, the nozzle 30 can be fitted into the spherical recess 21a. Since the nozzle 30 is pivotable in the spherical recess 21a, by applying the driver's power or the like to the nozzle 30, the tilt angle of the nozzle 30 with respect to the nozzle holding member 20 can be adjusted. As a result, the jet position on the front windshield 11 of the washer solution can be arbitrarily adjusted by the driver or the like on an individual basis.

The main body member 40 has: a spherical main body part 41 the same in radius of curvature as the spherical recess 21a; a jet side projection 42 projecting from the spherical main body part 41. The spherical main body part 41 is provided with: a recess 43, which is formed by a bottom part 43a; and a side wall part 43b surrounding the bottom part 43a. The recess 43 is open toward the end face 41a (dense hatching parts in FIG. 5) of the spherical main body part 41, and the end face 41a is flush with a front surface 42a (dense hatching parts in FIG. 5) of the jet side projection 42.

A pair of uneven parts 44 is provided in the vicinity of the side wall part 43b in the recess 43. On the same side of the uneven parts 44 as the end face 41a, uneven surfaces 44a (dense hatching parts in FIG. 5) are provided, respectively. In this case, the pair of uneven parts 44 is disposed in face-to-face relationship with each other so as to sandwich a center part of the spherical main body part 41. However, in FIG. 5, only one of the uneven parts 44 is shown.

Furthermore, a pair of flow-channel forming projection parts 45 is provided on the inside of the recess 43 that is close to the center of the spherical main body part 41. On the same side of the flow-channel forming projection parts 45 as the end face 41a, projection-part surfaces 45a (dense hatching parts in FIG. 5) are provided, respectively. Herein, the pair of flow-channel forming projection parts 45 is also disposed to be mutually opposed so as to sandwich the center part of the spherical main body part 41 as well as the pair of uneven parts 44.

Both of the pair of uneven parts 44 and the pair of flow-channel forming projection parts 45 extend from a bottom part 43a toward the end face 41a. The heights of the pair of uneven parts 44 and the pair of flow-channel forming projection parts 45 from the bottom part 43a are the same height that is lower than the height of the side wall part 43b from the bottom part 43a. More specifically, the part between the end face 41a and a front surface 42a (sparse hatching parts in FIG. 5) and the uneven surfaces 44a and the projection-part surfaces 45a (dense hatching parts in FIG. 5) has an uneven shape. This uneven shape forms a recessed attachment part 46. The recessed attachment part 46 is formed of the uneven surfaces 44a, the projection-part surfaces 45a, and the side wall part 43b and constitutes a recessed part of the present invention.

Herein, as shown by a solid line arrow of FIG. 8, a main flow channel (flow channel) MS through which the washer solution flows is formed between the pair of flow-channel forming projection parts 45. Also, as shown by broken line arrows of FIG. 8, sub flow channels (flow channels) SS1 and SS2 through which the washer solution flows are formed between the flow-channel forming projection parts 45 and the uneven parts 44.

The spherical main body part 41 is provided with an inlet port 47, and the inlet port 47 is connected to the main flow channel MS and the sub flow channels SS1 and SS2 in the recess 43. Also, the inlet port 47 is connected to the flow channel 21b with the nozzle 30 being attached to the nozzle holding member 20. Herein, as shown in FIG. 3, on the same side of the nozzle 30 as the inlet port 47, there is nothing that projects from the spherical outer surface of the nozzle 30. Therefore, the movable angle of "a" degrees of the nozzle 30 with respect to the nozzle holding member 20 can be increased without increasing the flow resistance of the washer solution. Note that the movable angle of "a" degrees in the drawing is a movable angle in the top-bottom direction, but the movable angle (not illustrated) thereof in the left-right direction can be also increased.

As shown in FIG. 8, the inlet port 47 is tapered toward the recess 43. In other words, the opening area in the outlet side (the same side as the recess 43) of the inlet port 47 is smaller than the opening area in the inlet side (the same side as the flow channel 21b). Therefore, the flow rate of the washer solution is increased when the washer solution flows into the recess 43 from the inlet port 47. Furthermore, the jet side projection 42 is provided with a jet port 48, which is connected to the recess 43. The jet port 48 has a tapered shape, which has a width narrowed as it gets closer to the recess 43. In other words, the opening area in the outlet side (the same side as the front windshield 11) of the jet port 48 is larger than the opening are in the inlet side (the same side as the recess 43). Therefore, the spread range of the washer solution with respect to the front windshield 11 can be enlarged.

As shown in FIG. 8, based on a center line "A" connecting the inlet port 47 and the jet port 48, the pair of uneven parts 44 and the pair of flow-channel forming projection parts 45 have line-symmetric shapes. The inner wall surfaces of the pair of uneven parts 44 extend along the center line "A" and are parallel to each other. The pair of flow-channel forming projection parts 45 is provided with: straight parts 45*b*, which are parallel to the center line "A"; and protruding parts 45*c*, which extend from the straight parts 45*b* toward the center line "A".

By providing the uneven parts 44 and the flow-channel forming projection parts 45 in this manner, the main flow channel MS, which flows from the same side as inlet port 47 to the same side as the jet port 48 as shown by the solid line arrow, and the pair of sub flow channels SS1 and SS2, which flow from the same side as the jet port 48 to the same side as inlet port 47 as shown by the broken line arrows, are formed. Herein, the pair of sub flow channels SS1 and SS2 are flow channels which connect the upstream side (the same side as the inlet port 47) and the downstream side (the same side as the jet port 48) of the main flow channel MS.

As shown in FIGS. 5 and 8, on the same side of the spherical main body part 41 as the inlet port 47, a through hole 41*b* has an approximately elliptical shape in cross section, and the through hole 41*b* connects the end face 41*a* and the inlet port 47 to each other. On the other hand, the jet side projection 42 is provided with a through hole 42*b* formed so as to have an approximately elliptical shape in cross section, and the through hole 42*b* connects the front surface 42*a* and the jet port 48 to each other. Furthermore, the jet side projection 42 is provided with a pair of holes 42*c* arranged in a direction orthogonal to the center line "A", and the holes 42*c* are disposed so as to sandwich the through hole 42*b*. However, the pair of holes 42*c* is not connected to the jet port 48. Furthermore, the jet side projection 42 is provided with a protruding part 42*d* having an approximately square shape protruding from the front surface 42*a* by a slight height.

A belt-like flat part 41*c* is provided on the outer surface of the spherical main body part 41, and the flat part 41*c* extends in a direction orthogonal to the center line "A". The flat part 41*c* is formed by indenting part of the periphery of the spherical main body part 41, and a gate generated in injection molding of the main body member 40 is disposed on the flat part 41*c*. Herein, minute burrs (part of the gate and unwanted matters) sometimes remain on the flat part 41*c* after molding of the main body member 40. However, even if the burrs remain, a gap through which the washer solution leaks is not formed between the outer peripheral part of the nozzle 30 and the inner peripheral part of the spherical recess 21*a* since the flat part 41*c* is formed by indenting the outer surface of the spherical main body part 41. Furthermore, since the flat part 41*c* is provided to be orthogonal to the direction in which the washer solution flows, in other words, to the direction of the main flow channel MS (the extending direction of the center line "A") shown by the solid line arrow of FIG. 8, the washer solution does not leaks from the same side as the inlet port 47 to the same side as the jet port 48 along the outer surface of the spherical main body part 41.

As shown in FIGS. 5 and 6, the lid member 50 is provided with an attachment main body 51, which is attached to the recessed attachment part 46 of the main body member 40. The attachment main body 51 is formed into a shape which can fit the recessed attachment part 46, and the attachment main body 51 is provided with an outer peripheral wall part 51*a*, which adheres to the side wall part 43*b* forming the recessed attachment part 46. Herein, as shown in FIG. 4, the joint surfaces of the outer peripheral wall part 51*a* of the attachment main body 51 and the side wall part 43*b* of the recessed attachment part 46 form a taper surface "T" set at an inclination angle of "β" degrees. Specifically, the attachment main body 51 and the recessed attachment part 46 are formed into a tapered shape toward the bottom part 43*a*. By virtue of this, an operation of assembling the lid member 50 with the main body member 40 is easily carried out.

On the same side of the attachment main body 51 as the bottom part 43*a*, a main-body-side surface 51*b* (dense hatching part in FIG. 6), which abuts on both of the uneven surfaces 44*a* of the uneven parts 44 and the projection-part surfaces 45*a* of the flow-channel forming projection parts 45, is provided. By attaching the attachment main body 51 to the recessed attachment part 46, the main-body-side surface 51*b* abuts on the uneven surfaces 44*a* and the projection-part surfaces 45*a* and, as a result, forms the main flow channel MS and the pair of sub flow channels SS1 and SS2. Herein, the uneven surfaces 44*a* and the projection-part surfaces 45*a* constitute a first abutting surface of the present invention, and the main-body-side surface 51*b* constitutes a second abutting surface of the present invention.

In the side of the attachment main body 51 that is opposite to the main-body-side-surface-51*b* side, a spherical surface 51*c* is provided. The curvature radius of the spherical surface 51*c* is set approximately at the same curvature radius as that of the spherical main body part 41 of the main-body member 40. Also on the spherical surface 51*c* of the attachment main body 51, a belt-like flat part 51*d* similar to the flat part 41*c* of the spherical main body part 41 is formed. The flat part 51*d* is extended in a direction orthogonal to the center line "A" (see FIG. 8), and a hollowed gate dent 51*e* at which the gate generated in injection molding of the lid member 50 is disposed is formed at a part approximately at the center in the extending direction of the flat part 51*d*. Moreover, in both sides of the gate dent 51*e* in the extending direction of the flat part 51*d*, pin holes 51*f* formed by a pair of retaining pins 94 (see FIG. 9) of a fixed mold 90 used in the injection molding of the lid member 50 are formed, respectively.

The attachment main body 51 is integrally provided with a pair of flange parts 52. These flange parts 52 extend in a direction intersecting with an attaching direction of the lid member 50 to the main body member 40. Specifically, with the lid member 50 being attached to the main body member 40, the paired flange parts 52 are respectively disposed on the same side of the attachment main body 51 as the inlet port 47 and the same side of the attachment main body 51 as the jet port 48.

On the same side of the pair of flange parts 52 as the bottom part 43*a*, flange-part surfaces 52*a* (sparse hatching parts in FIG. 6), which abut on the end face 41*a* of the spherical main body part 41 and the front surface 42*a* of the jet side projection 42, are provided. Herein, as shown in FIG. 4, the height h1 of the recessed attachment part 46 is set to a height slightly lower than the height h2 of the part corresponding to the outer peripheral wall part 51*a* of the attachment main body 51 (h1<h2). Therefore, the attachment main body 51 is attached so that the attachment main body is pushed into the recessed attachment part 46, and the flange-part surfaces 52*a* of the pair of flange parts 52 are caused to abut on the end face 41*a* and the front surface 42*a* of the main body member 40; as a result, the uneven surfaces 44*a* and the projection-part surfaces 45*a* adhere to the main-body-side surface 51*b*. Therefore, a gap is reliably prevented from being formed between the uneven surfaces 44*a* and the projection-part surfaces 45*a* and the main-body-side surface 51*b* by the fluid pressure of the washer solution, which flows through the main flow channel MS and the pair of sub flow channels SS1 and SS2, the shapes of the main flow channel MS and the pair of sub flow channels SS1 and SS2 are retained with high precision, and the spray characteristics of the washer solution can be maintained well.

As shown in FIGS. 5 and 7, the covering member 60 is provided with a bowl-like main body part 61, which covers the exposed part of the lid member 50 from the recessed attachment part 46, and a jet side covering part 62, which covers the front surface 42a of the jet side projection 42.

A recessed housing part 61a, which houses part of the lid member 50, is formed on the same side of the bowl-like main body part 61 as the lid member 50, and the recessed housing part 61a is configured to adhere to the spherical surface 51c of the lid member 50. An edge surface 61b (sparse hatching part in FIG. 7) is provided around the recessed housing part 61a, and the edge surface 61b is configured to adhere to the end face 41a of the spherical main body part 41. The edge surface 61b is provided with an anchor 63, and the anchor 63 is disposed on the same side of the bowl-like main body part 61 as the inlet port 47 with the covering member 60 being attached to the main body member 40. The anchor 63 is configured to fit the through hole 41b of the spherical main body part 41.

On the same side of the jet side covering part 62 as the jet side projection 42, an adhesion surface 62a (sparse hatching part in FIG. 7) is provided, and the adhesion surface 62a is configured to adhere to the front surface 42a of the jet side projection 42. The adhesion surface 62a is provided with a single anchor 64 and a pair of anchors 65. The single anchor 64 is configured to fit the through hole 42b of the jet side projection 42. On the other hand, the pair of anchors 65 is configured to fit the pair of holes 42c of the jet side projection 42, respectively. Furthermore, on the same side of the jet side covering part 62 as the jet side projection 42, a recessed adhesion part 66 having an approximately square shape is provided. The protruding part 42d of the jet side projection 42 is configured to fit the recessed adhesion part 66.

In this manner, since the covering member 60 comes in close contact with the main body member 40 so as to cover the lid member 50, the covering member 60 is configured to cover the exposed part of the lid member 50 from the main body member 40, and configured to hermetically close (seal) the contact part between the main body member 40 and the lid member 50.

Furthermore, the coupling strength between the covering member 60 and the main body member 40 is improved by respectively fitting the plurality of anchors 63, 64, and 65 in the through holes 41b and 42b and the hole 42c, and fitting the protruding part 42d in the recessed adhesion part 66. Therefore, the main body member 40 and the lid member 50, which collectively form the main flow channel MS and the pair of sub flow channels SS1 and SS2, can adhere to each other with high strength, and also by virtue of this structure, the shapes of the main flow channel MS and the pair of sub flow channels SS1 and SS2 are maintained with high precision, and the spray characteristics of the washer solution can be maintained well.

A spherical surface 61c is provided to the opposite side of the bowl-like main body part 61 from the recessed housing part 61a. The curvature radius of the spherical surface 61c is set so as to become approximately equal to that of the spherical main body part 41 of the main body member 40. And, a belt-like flat part 61d similar to the flat part 41c of the spherical main body part 41 is formed on the spherical surface 61c of the bowl-like main body part 61. The flat part 61d extends in a direction orthogonal to the center line "A"

(see FIG. 8), and a hollowed gate dent 61e, at which a gate generated in injection molding of the covering member 60 is disposed, is formed at an approximately center part in the extending direction of the flat part 61d. Furthermore, on both sides of the gate dent 61e in the extending direction of the flat part 61d, pin holes 61f formed by the pair of retaining pins 94 (see FIG. 9) of the fixed mold 90 used in injection molding of the covering member 60 are formed. Note that the flat part 61d formed on the outer surface of the covering member 60 constitutes a dent part in the present invention.

Next, self-oscillating actions of the washer solution by the nozzle 30, which is formed in the above manner, will be explained.

The washer solution flowed into the recess 43 from the inlet port 47 flows to the jet port 48 along the main flow channel MS as shown by the solid line arrow of FIG. 8. The washer solution flowing between the flow-channel forming projection parts 45 is spread along the straight parts 45b, and part of the washer solution flows into the sub flow channels SS1 and SS2 on the same side of the jet port 48. The washer solution flowed into the sub flow channels SS1 and SS2 flows in a direction opposite to the main flow channel MS as shown by the broken line arrows of FIG. 8, and are merged on the upstream side of the main flow channel MS. In this manner, by merging the sub flow channels SS1 and SS2 at predetermined timing on the upstream side of the main flow channel MS as feedback flows, the washer solution jetted from the jet port 48 is oscillated as shown by a two-dot chain arrow of FIG. 8. As a result, the washer solution is widely spread from the jet port 48 toward the front windshield 11.

Next, a manufacturing method of the nozzle 30 formed in the above described manner will be explained in detail with reference to the drawings. Note that the cross section of the nozzle 30 shown in FIGS. 9 to 13 corresponds to the cross section along a line B-B of FIG. 8.

Figure 9:
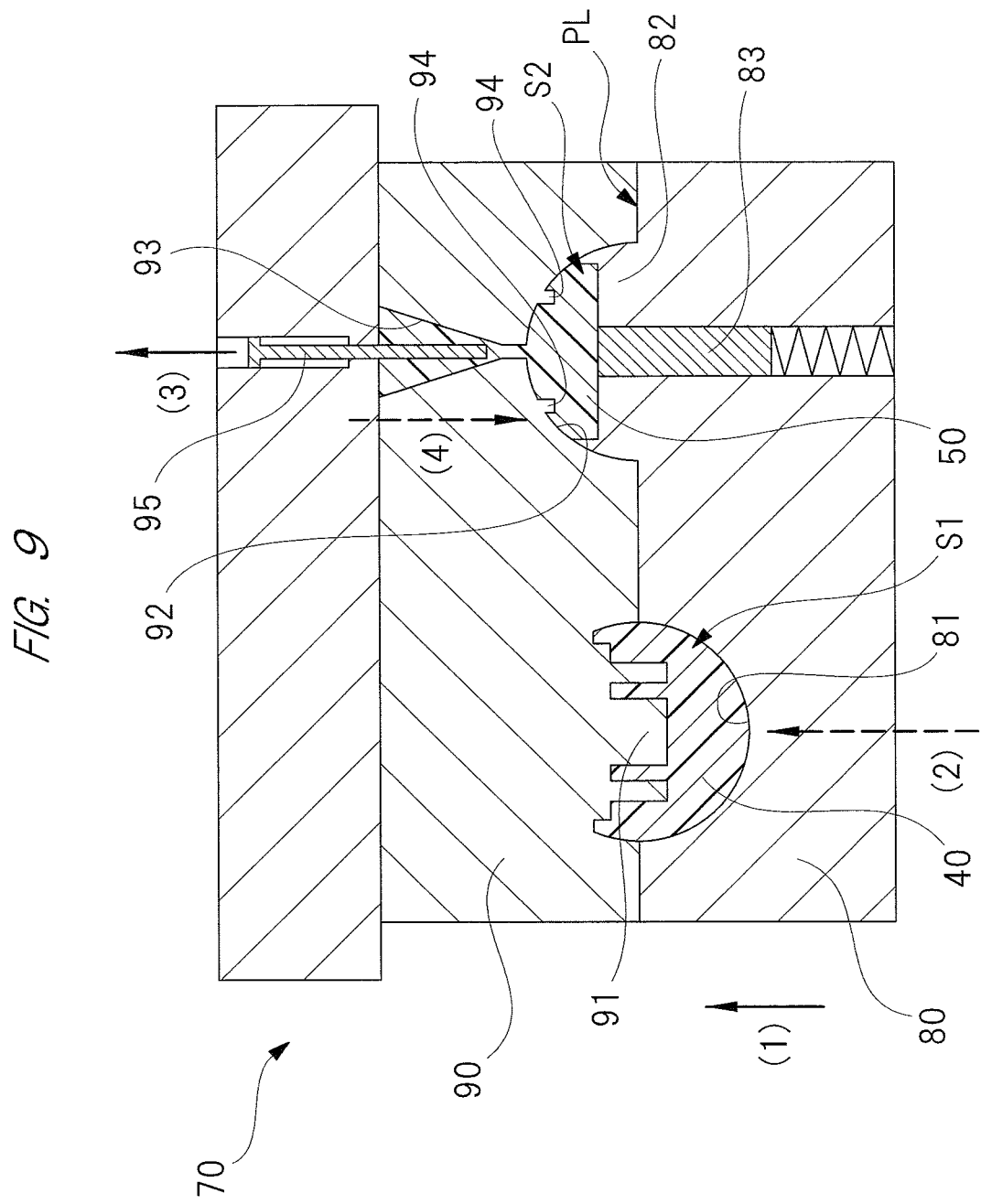
FIG. 9 is an explanatory view explaining a primary molding step of the nozzle.
Figure 10:
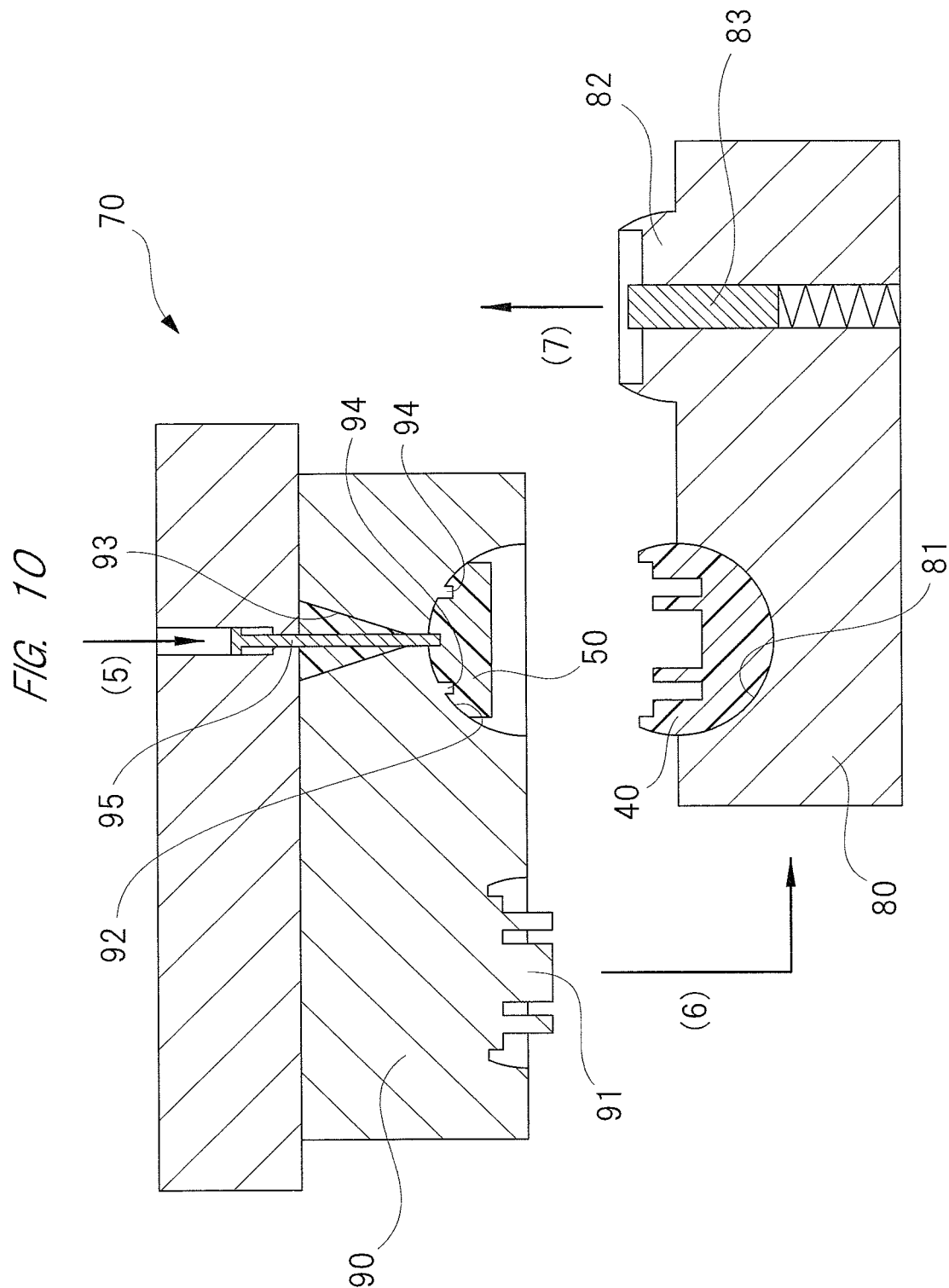
FIG. 10 is an explanatory view explaining relative movements of first and second molds.
Figure 11:
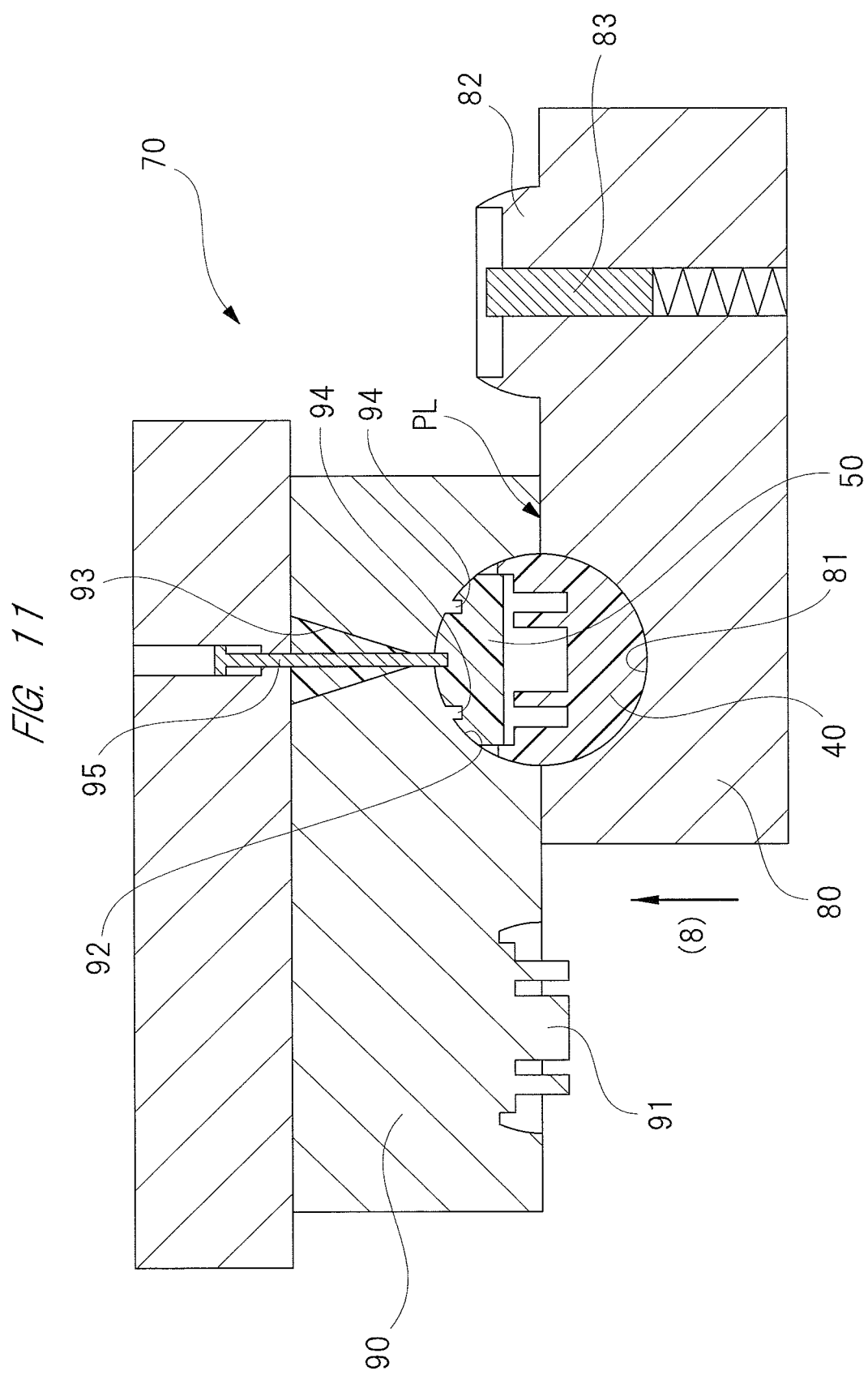
FIG. 11 is an explanatory view explaining a secondary molding step (mold butting stage) of the nozzle.
Figure 12:
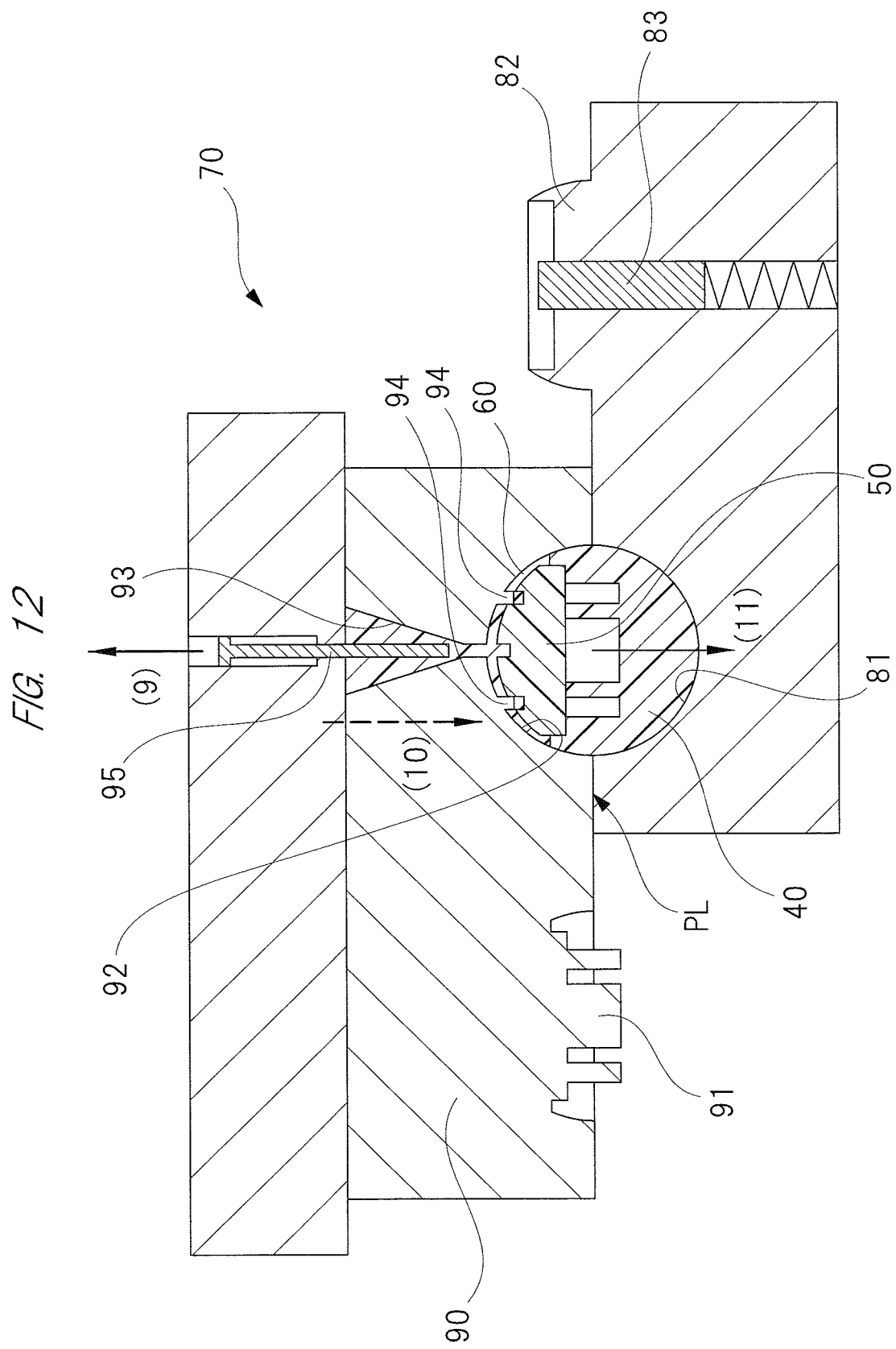
FIG. 12 is an explanatory view explaining the secondary molding step (molten resin injection stage) of the nozzle.
Figure 13:
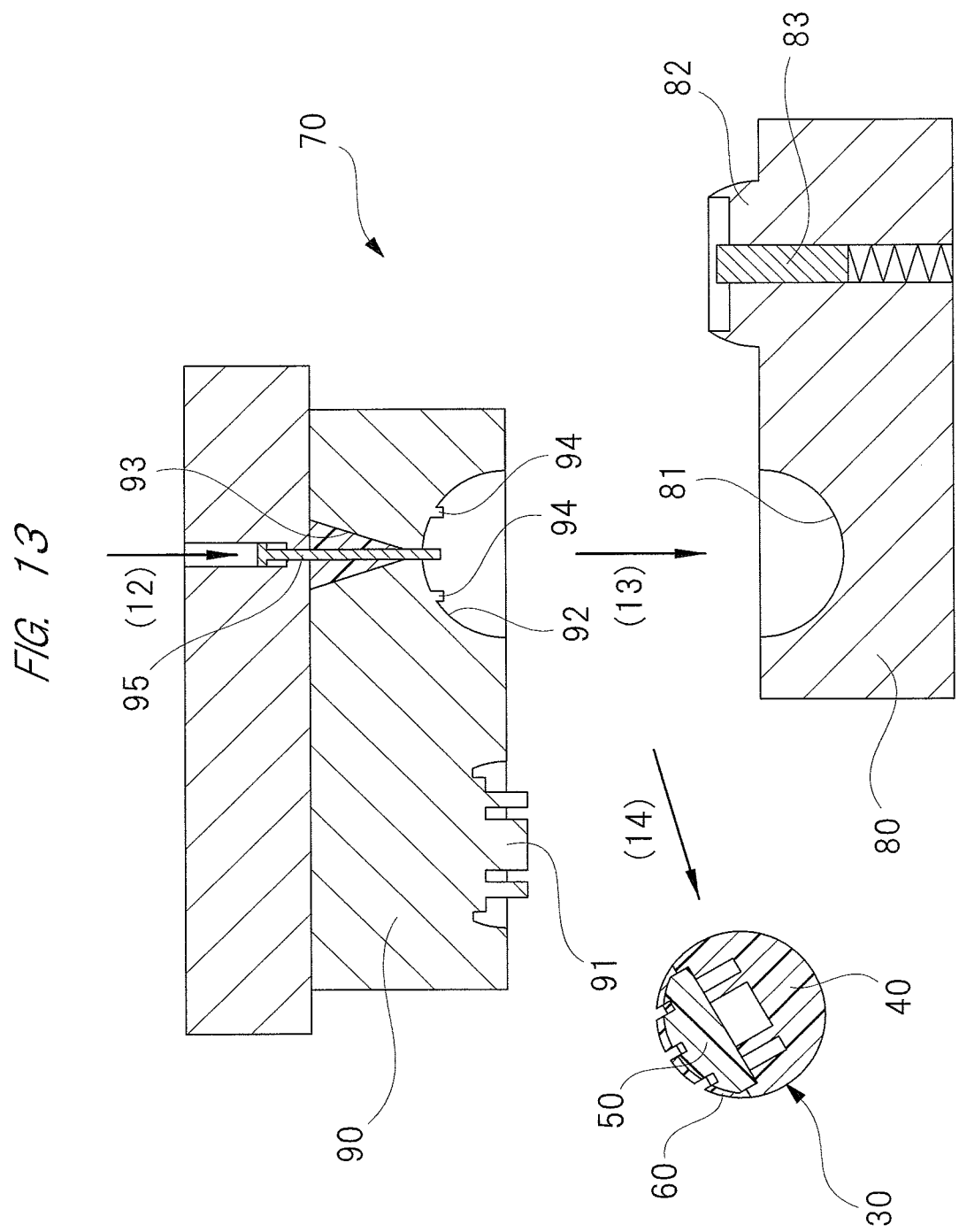
FIG. 13 is an explanatory view explaining an ejecting step of the completed nozzle.

FIG. 9 is an explanatory view explaining a primary molding step of the nozzle, FIG. 10 is an explanatory view explaining relative movements of first and second molds, FIG. 11 is an explanatory view explaining a secondary molding step (mold butting stage) of the nozzle, FIG. 12 is an explanatory view explaining a secondary molding step (molten resin injection stage) of the nozzle, and FIG. 13 is an explanatory view explaining a step of ejecting the completed nozzle.

First, before explaining the manufacturing method of the nozzle 30, an outline of an injection molding apparatus 70, which is used in manufacturing of the nozzle 30, will be explained.

As shown in FIG. 9, the injection molding apparatus 70 is provided with a movable mold 80 which can be moved in vertical and horizontal directions by a drive mechanism (not illustrated), and the fixed mold 90, which is fixed to a frame (not illustrated) of the injection molding apparatus 70. Note that, as a drive mechanism for moving the movable mold 80, an actuator such as cylinder device which is actuated by oil pressure, air pressure or an electric motor is used.

The movable mold 80 constitutes the first mold in the present invention. The movable mold 80 is, on the basis of a parting line PL, formed with: a first cavity 81, which has an approximately semispherical concave shape; and a second core 82, which protrudes and has an approximately circular truncated cone shape. The first cavity 81 is connected to a molten-resin supply passage (not illustrated), and the second core 82 is provided with a pusher pin 83, which is driven in a removing direction of a molded object (upward in this drawing). The first cavity 81 and the second core 82 are provided on the movable mold 80 so that they are arranged at a predetermined interval.

The fixed mold 90 constitutes the second mold in the present invention. The fixed mold 90 is, on the basis of the parting line PL, formed with: a first core 91 for forming the main flow channel MS and the pair of sub flow channels SS1 and SS2 (see FIG. 8); and a second cavity 92, which has an approximately semispherical shape. A molten-resin supply passage 93 is connected to a center part of the second cavity 92, and on both sides of the molten-resin supply passage 93, the pair of retaining pins 94 is provided so as to sandwich the molten-resin supply passage 93. These retaining pins 94 have a function to temporarily retain a molded object.

In the molten-resin supply passage 93, a valve pin 95, which controls supply of molten resin, is provided so that the valve pin is movable in forward and backward directions. When the valve pin 95 is moved backward from the molten-resin supply passage 93, the molten-resin supply passage 93 opens, and the molten resin is supplied toward the second cavity 92. On the other hand, when the valve pin 95 is moved forward toward the molten-resin supply passage 93, the molten-resin supply passage 93 is closed, so that the supply of molten resin toward the second cavity 92 is stopped. Note that, although not illustrated in the drawings, a molten-resin supply mechanism similar to this is provided also on the same side as the first cavity 81.

[Mold Preparing Step]

First, the drive mechanism of the injection molding apparatus 70 is actuated so as to move the movable mold 80 in a direction shown by a solid line arrow (1) of FIG. 9. As a result, the fixed mold 90 and the movable mold 80 are combined with each other with the parting line "PL" serving as a boundary. In this process, the drive control of the movable mold 80 is performed with high precision, so that the first cavity 81 and the first core 91 are disposed with high precision in face to face relationship with each other, and the second cavity 92 and the second core 82 are disposed with high precision in face to face relationship with each other.

As a result, a first gap 51 for molding the main body member 40 is formed between the first cavity 81 and the first core 91, and a second gap S2 for molding the lid member 50 is formed between the second cavity 92 and the second core 82.

[Main Body Member Molding Step]

Then, a resin dispenser (not illustrated) and a valve pin (not illustrated) are actuated so as to supply molten resin to the molten-resin supply passage connected to the first cavity 81. As a result, as shown by a broken line arrow (2) of FIG. 9, the molten resin is injected into the first gap 51, so that the first gap 51 is filled with the molten resin. In this manner, the main body member 40 is formed. Note that an air venting hole (not illustrated) is connected to the first gap 51.

Herein, the inlet port 47 and the jet port 48 (see FIG. 4), provided in the main body member 40, are formed by a pair of slide molds (not illustrated) of the injection molding apparatus 70.

[Lid Member Molding Step]

At the same time as that in the main body member molding step, a resin dispenser (not illustrated) is actuated so as to supply molten resin to the molten-resin supply passage 93 connected to the second cavity 92. At this point, the pusher pin 83 is in a stopped state at a reference position (pulled-in position) shown in FIG. 9. Then, as shown by a solid line arrow (3) of FIG. 9, the valve pin 95 is moved backward from the molten-resin supply passage 93 to open the molten-resin supply passage 93. As a result, as shown by a broken line arrow (4) of FIG. 9, the molten resin is injected into the second gap S2, so that the second gap S2 is filled with the molten resin. In this manner, the lid member 50 is formed. Note that an air venting hole (not illustrated) is connected to the second gap S2.

Then, as shown by a solid line arrow (5) of FIG. 10, the valve pin 95 is moved forward toward the molten-resin supply passage 93 to close the molten-resin supply passage 93. At this point, a distal end part (lower side in the drawing) of the valve pin 95 digs into the lid member 50 by a predetermined depth, so that the gate dent 51e does not project out from the spherical surface 51c (see FIG. 5).

The main body-member molding step and the lid-member molding step described above are defined as the primary molding step of the nozzle 30. However, the main body-member molding step and the lid-member molding step are not limited to the above manner, that is, these processes are performed at the same time, and for example, the main body-member molding step may be performed before the lid-member molding step in consideration of the hardening time of the molten resin. In this manner, it is possible to arbitrarily determine the timing of performing the main body-member molding step and the lid-member molding step.

[Mold Moving Step]

Then, the drive mechanism of the injection molding apparatus 70 is actuated so as to move the movable mold 80 in a direction shown by a solid line arrow (6) of FIG. 10. More specifically, the movable mold 80 is moved with respect to the fixed mold 90 in a downward direction so as to separate the movable mold 80 and the fixed mold 90 from each other, and the movable mold 80 is then slid in a lateral direction with respect to the fixed mold 90 so that the first cavity 81 and the second cavity 92 are disposed in face to face relationship with each other.

In this process, when the movable mold 80 is separated from the fixed mold 90, as shown by a solid line arrow (7) of FIG. 10, the pusher pin 83 is driven in a removing direction (projecting direction). Then, the action of the pusher pin 83 and a retaining function of the pair of retaining pins 94 maintain the lid member 50 with the lid member being attached to the second cavity 92.

On the other hand, since the contact area of the main body member 40 with the first cavity 81 is larger than the contact area thereof with respect to the first core 91, a state in which the main body member 40 is attached to the first cavity 81 (pasted state) is retained. However, in order to reliably retain the main body member 40 in the first cavity 81, the first core 91 may be also provided with pusher pins as well as the second core 82.

Subsequently, the drive mechanism of the injection molding apparatus 70 is actuated so as to move the movable mold 80 in a direction shown by a solid line arrow (8) of FIG. 11. As a result, the fixed mold 90 and the movable mold 80 are combined with each other again with the parting line PL serving as a boundary. In this manner, in the mold moving step, the fixed mold 90 and the movable mold 80 are relatively moved so as to combine the first cavity 81 retaining the main body member 40 and the second cavity 92 retaining the lid member 50 with each other, so that the main body member 40 and the lid member 50 is disposed with high precision in face to face relationship with each other.

[Covering member Molding Step]

Then, the resin dispenser is actuated to supply the molten resin again to the molten-resin supply passage 93 connected to the second cavity 92. Then, as shown by a solid line arrow (9) of FIG. 12, the valve pin 95 is moved backward from the molten-resin supply passage 93 to open the molten-resin supply passage 93. As a result, as shown by a broken line arrow (10) of FIG. 12, the molten resin is injected in the second cavity 92, and the molten resin is supplied by a predetermined pressure toward the back surface of the lid member 50, in other words, toward the spherical surface 51c of the lid member 50 (see FIG. 5).

As a result, as shown by a solid line arrow (11) of FIG. 12, the lid member 50 is detached from the pair of retaining pins 94 by the pressure of the molten resin, and the attachment main body 51 of the lid member 50 is attached to the recessed attachment part 46 of the main body member 40 (see FIG. 5). Subsequently, the supply of molten resin is continuously performed, and as a result, the flange-part surfaces 52a of the pair of flange parts 52 abut on the end face 41a and the front surface 42a of the main body member 40 (see FIG. 4), respectively. As a result, the lid member 50 comes in close contact with the main body member 40, and the main flow channel MS and the pair of sub flow channels SS1 and SS2 (see FIG. 8) are formed on the inside of the members 40 and 50.

Furthermore, the covering member 60, which covers the exposed part of the lid member 50 from the recessed attachment part 46 with the lid member 50 being attached to the main body member 40, and the plurality of anchors 63, 64, and 65 (see FIG. 7) being fitted in the through holes 41b and 42b and the hole 42c (see FIG. 5), is formed.

In this process, when the covering member 60 is cooled and hardened, the covering member 60 shrinks in some degree. However, since the covering member 60 is provided with a plurality of anchors 63, 64, and 65 and the like for increasing the coupling strength with the main body member 40, even when the covering member 60 shrinks, the adhesion between the main body member 40, the lid member 50, and the covering member 60 is almost not changed at all.

Then, as shown by a solid line arrow (12) of FIG. 13, the valve pin 95 is moved forward toward the molten-resin supply passage 93 to close the molten-resin supply passage 93. In this process, the distal end part of the valve pin 95 digs into the covering member 60 by a predetermined depth (not illustrated in detail), and as a result, the gate dent 61e does not project out from the spherical surface 61c (see FIG. 5).

In this process, since the pair of flange parts 52 abuts on the main body member 40, it is possible to regulate the degree of insertion of the attachment main body 51 with respect to the recessed attachment part 46. This stabilizes the shapes of the main flow channel MS and the pair of sub flow channels SS1 and SS2 for each product, and variations in shape of the flow channels can be suppressed.

Furthermore, the contact surfaces between the lid member 50 and the main body member 40 are bent in approximately L-shapes by providing the pair of flange parts 52 (see FIG. 4). By virtue of this, when the covering member 60 is molded, the molten resin is prevented from leaking from the outside of the lid member 50 toward the main flow channel MS and the pair of sub flow channels SS1 and SS2 therein, and variations in shape of the flow channels is also suppressed by this. However, it is not limited to provide the pair of flange parts 52 in the above described manner, but a single annular flange part can be also provided so as to surround the periphery of the attachment main body 51. In that case, leakage of the molten resin into the flow channels is more reliably prevented.

Herein, the covering member molding step of molding the covering member 60 is defined as the secondary molding step of the nozzle 30.

[Ejecting Step]

Then, the drive mechanism of the injection molding apparatus 70 is actuated so as to move the movable mold 80 in a direction shown by a solid line arrow (13) of FIG. 13. As a result, the movable mold 80 and the fixed mold 90 are separated from each other, and the completed nozzle 30 can be ejected in a direction shown by a solid line arrow (14) of FIG. 13. Herein, the ejection of the nozzle 30 from the fixed mold 90 and the movable mold 80 is performed by driving pusher pins (not illustrated) respectively provided at the first cavity 81 and the second cavity 92.

In this manner, in the above described injection molding apparatus 70, both of the lid member 50 (primary molded object) and the covering member 60 (secondary molded object) are molded in the second cavity 92 of the fixed mold 90. Therefore, for example, the resin dispenser and the molten-resin supply passage 93 for molding the lid member 50 and the covering member 60 are shared to improve the manufacturing efficiency of the nozzle 30, and downsizing and energy saving of the injection molding apparatus 70 can be realized.

As described above in details, according to the nozzle 30 according to the present embodiment, when the attachment main body 51 of the lid member 50 is attached to the recessed attachment part 46 of the main body member 40, the pair of flange parts 52 provided on the lid member 50 abuts on the main body member 40; therefore, the degree of insertion of the attachment main body 51 with respect to the recessed attachment part 46 is enabled to become approximately constant for each product. Therefore, while enlarging the main flow channel MS and the pair of sub flow channels SS1 and SS2, which are formed by the main body member 40 and the lid member 50, variations in shape of the flow channels can be reliably suppressed.

Furthermore, since the lid member 50 is provided with a pair of flange parts 52, the contact surface between the lid member 50 and the main body member 40 can be bent. Therefore, when the covering member 60 is molded, the molten resin can be prevented from leaking from the outside of the lid member 50 toward the main flow channel MS and the pair of sub flow channels SS1 and SS2 therein, and, also by virtue of this, variations in shape of the flow channels can be reliably prevented.

Furthermore, the nozzle 30 according to the present embodiment is rotatably attached to the spherical recess 21a of the nozzle holding member 20 by press-fitting. More specifically, the spherical recess 21a presses the periphery of the nozzle 30. Therefore, even when a large fluid pressure of the washer solution is applied to the main flow channel MS and the pair of sub flow channels SS1 and SS2, the lid member 50 and the main body member 40 are not separated from each other, and as a result, variations in shape of the flow channel can be reliably suppressed.

The present invention is not limited to the above embodiment, and it goes without saying that various modifications can be made without departing from the scope of the invention. For example, although the nozzle 30 for jetting washer solution toward the front windshield 11 of the vehicle 10 is explained in the above embodiment, the present invention is not limited to this, and may be applied to a nozzle for jetting washer solution toward a rear windshield of a vehicle.

Furthermore, the nozzle 30 provided to the vehicle 10 is explained in the above embodiment. However, the present invention is not limited to this, and may be also applied to a nozzle for cleaning a windshield of an airplane, a railroad vehicle, and the like.

What is claimed is:

1. A washer nozzle provided with a nozzle for jetting cleaning solution to a surface to be cleaned, and a nozzle holding member for retaining the nozzle, wherein the nozzle comprises:
- a main body member having a main body part formed into a partially spherical shape, the main body part having: a recess formed by a bottom part and a side wall part surrounding the bottom part; an end face forming an opening of the recess; a pair of flow-channel forming projection parts extending from the bottom part toward the opening; and
- a recessed attachment part formed by a level difference between the end face and the flow-channel forming projection parts;
- a lid member fitted in the recessed attachment part so that the recess and the flow-channel forming projection parts collectively form a flow channel, the lid member having a pair of flange parts extending in a direction intersecting with an attachment direction of the lid member to the recessed part, and abutting on the end face of the main body part with the lid member fitted in the recessed attachment part; and
- a covering member completely covering the end face of the main body part and a spherical surface of the lid member from the recessed attachment part, such that the covering member is in direct contact with the end face of the main body part and the spherical surface of the lid member, wherein
- the flow-channel forming projection parts each has a first abutting surface, the lid member having a second abutting surface, the flange parts are caused to abut on the end face of the main body part so that the first abutting surface faces in close contact with the second abutting surface, and the flow channel is formed in the partially spherical main body part, and
- the nozzle is formed into a spherical shape and pivotably retained by a spherical recess of the nozzle holding member.

2. The washer nozzle according to claim 1, wherein the side wall part of the main body member extends along an outer periphery of the outer peripheral wall part of the lid member.

3. The washer nozzle according to claim 1, wherein the covering member has:
- a recessed housing part in which the lid member is partially housed, and
- an edge surface provided around the recessed housing part,
- wherein the edge surface keeps in contact with the end face of the main body part.

4. The washer nozzle according to claim 3, wherein the covering member has an outer surface which is substantially the same in curvature radius as an outer surface of the main body member.

5. The washer nozzle according to claim 1, wherein
- a first flat or indented portion part is provided on an outer surface of the main body part, and
- a second flat or indented portion part is provided on an outer surface of the covering member, and a hollowed part is formed on the second flat or indented portion part of the covering member.

* * * * *